(12) United States Patent
Hansen et al.

(10) Patent No.: US 6,987,246 B2
(45) Date of Patent: Jan. 17, 2006

(54) HUMIDITY CONTROL SYSTEM FOR COMBINATION OVEN

(75) Inventors: William J Hansen, Pewaukee, WI (US); Jan Bartelick, Brown Deer, WI (US)

(73) Assignee: Alto-Sham, Inc., Menomonee Falls, WI (US)

( * ) Notice: Subject to any disclaimer, the term of this patent is extended or adjusted under 35 U.S.C. 154(b) by 0 days.

(21) Appl. No.: 10/488,173

(22) PCT Filed: Sep. 6, 2002

(86) PCT No.: PCT/US02/28455

§ 371 (c)(1),
(2), (4) Date: Aug. 9, 2004

(87) PCT Pub. No.: WO03/023285

PCT Pub. Date: Mar. 20, 2003

(65) Prior Publication Data

US 2004/0261632 A1    Dec. 30, 2004

Related U.S. Application Data

(60) Provisional application No. 60/318,249, filed on Sep. 7, 2001.

(51) Int. Cl.
*A21B 1/24* (2006.01)
*A21B 1/26* (2006.01)
*A21B 3/04* (2006.01)

(52) U.S. Cl. .................................... 219/401; 126/20
(58) Field of Classification Search ............... 219/401; 126/20; 99/467, 468, 473–476
See application file for complete search history.

(56) References Cited

U.S. PATENT DOCUMENTS

| | | | | |
|---|---|---|---|---|
| 4,506,598 A * | 3/1985 | Meister | ........................ | 99/330 |
| 4,700,685 A * | 10/1987 | Miller | ........................ | 126/20 |
| 4,924,072 A | 5/1990 | Oslin | ........................ | 219/401 |
| 5,235,903 A | 8/1993 | Tippmann | .................... | 99/331 |
| 5,530,223 A * | 6/1996 | Culzoni et al. | ............. | 219/401 |
| 5,694,835 A | 12/1997 | Mangina | ...................... | 99/468 |
| 5,768,982 A * | 6/1998 | Violi et al. | ................... | 99/476 |
| 6,023,050 A * | 2/2000 | Violi | ........................ | 219/401 |
| 6,070,517 A * | 6/2000 | Helm | ........................ | 99/330 |
| 6,188,045 B1 * | 2/2001 | Hansen et al. | ............. | 219/401 |
| 6,555,791 B2 * | 4/2003 | Lubrina et al. | ............. | 219/400 |
| 6,564,792 B2 * | 5/2003 | Bassoli et al. | ............. | 126/21 A |
| 2004/0256374 A1 * | 12/2004 | Riefenstein et al. | ........ | 219/400 |

* cited by examiner

*Primary Examiner*—Joseph Pelham
(74) *Attorney, Agent, or Firm*—Quarles & Brady, LLP

(57) ABSTRACT

A combination oven for the preparation of food has a cooking chamber containing heating elements, a fan and an atomizer for radiant, convective or steam cooking. The humidity within the cooking chamber is controlled by a water valve and either by forcing dry air into the cooking chamber and venting the humid air or by using a pressure box. Without any moving parts, the pressure box controls air exchange of the cooking chamber according to the level of water within the pressure box and the pressure in the cooking chamber. The oven has a condensate tank to collect condensation drained from the cooking chamber. The pressure box and condensate tanks form water barriers effectively isolating the cooking chamber from the vent and drain during cooking until venting is required.

30 Claims, 6 Drawing Sheets

HUMIDITY CONTROL SYSTEM FOR COMBINATION OVEN

CROSS-REFERENCE TO RELATED APPLICATIONS

This application claims the benefit of U.S. provisional application Ser. No. 60/318,249, filed Sep. 7, 2001.

STATEMENT OF FEDERALLY SPONSORED RESEARCH/DEVELOPMENT

Not Applicable.

BACKGROUND OF THE INVENTION

The present invention relates to food preparation ovens, and in particular, to combination convection and steam ovens.

Combination ovens provide the ability to cook foods using steam, hot air convection or both steam and convection. A motor driven fan is ordinarily used to circulate air within a cooking chamber past electrical heating elements or gas heat exchange tubes. To produce steam within the cooking chamber, a water line feeds water into the cooking chamber near the heating elements to vaporize the water.

Combination ovens typically feed water to the center of the fan so that the water is drawn through the fan. Contact of the water with the fan blades separates the water into small droplets providing a larger overall surface area which can be vaporized more efficiently. To further improve thermal efficiency, some combination ovens include an atomization element at the hub of the fan which is rotated by the motor. The atomization element acts to initially break up the water before it is further reduced by the fan blades. The atomization process produces a fine mist of water surrounding the heating elements.

It is desirable to control the level of humidity during the cooking process. For example, low humidity may be desired when cooking by radiant heating or convection without steam to form a crust on the outside of certain foods, such as pastries, breads and meats. However, if the food has a high water content, the excess moisture can evaporate into the cooking chamber and prevent the formation of crust. This can also affect the cooking time and texture of food cooked with steam. Moreover, when cooking with steam it may also be desirable to quickly evacuate the moisture from the cooking chamber in a controlled manner so that a second food can be cooking using a radiant or convective process and to reduce the volume of steam escaping from the cooking chamber when the oven door is opened. This is particularly useful in the commercial food preparation industry.

It is also important to be able to quickly vent the cooking chamber to alleviate certain low or high-pressure conditions within the cooking chamber that can result, for example, from frozen food being placed in a hot cooking chamber or when the oven door is closed rapidly. The cooking chamber is ordinarily vented through a valve operated chimney or vent. While this relieves the pressure imbalance, it can also cause significant temperature and humidity losses due to the interior of the cooking chamber being in direct communication with the outside air, which adversely effect the efficiency of the oven.

Accordingly, a combination steam and convection oven is desired that provides improved venting and humidity control.

SUMMARY OF THE INVENTION

The present invention provides a combination steam and convection oven for preparing food having an improved humidity control system. The oven includes an air mover and a cooking chamber with a heating element for heating the cooking chamber and creating convection and/or a fine steam.

In one aspect the invention provides an oven with an intake line having one end outside the cooking chamber and an opposite open end extending into the cooking chamber for bringing air from outside the cooking chamber into the cooking chamber.

The invention thus provides a combi-oven in which relatively cool and dry air can be introduced into the cooking chamber during the cooking process. This positive inward air flow pressurizes the chamber and can cause an exhaust vent or drain to open to evacuate the hot, moist air in the chamber as needed. The positive air flow allows for more accurate humidity control in less time.

The intake line can perform double duty by being the conduit for bring the air and water inside the cooking chamber. An electronic control unit, operating according to control signals provided by temperature or humidity probes, can selectively open and close air and water valves to permit water to enter the cooking chamber during the steam process and air to enter during dehumidification. As such, only a single conduit is needed for both air and water supply.

In one preferred form, the control unit executes stored dehumidifying algorithms in response to a signal from the temperature sensors, humidity sensor or a user interface indicating a change in the humidity level inside the oven enclosure is needed. To lower humidity, for example, the control unit operates the water valve to prevent water from exiting the intake line into the cooking chamber and operates the air valve to allow air to exit the intake line into the cooking chamber. This brings in relatively cool, dry air and pressurizes the cooking chamber. At a prescribed pressure, the exhaust vent or a drain barrier opens to evacuate the hot, moist air within the cooking chamber. The air is forced into the cooking chamber either by a pump, or preferably, by a fan which creates a low pressure area inside the cooking chamber adjacent open end of the intake line. Additionally, the intake line can have water only and air only sections each with a corresponding water or air valve.

In another aspect the invention provides a combi-oven having a pressure box. The pressure box has an inlet and an outlet in series with the intake line and a vent in communication with air outside the cooking chamber. The pressure box receives water through the inlet from the intake line and establishes a working water level within the pressure box such that water can pass through the pressure box outlet to the cooking chamber via the intake line when the water in the pressure box is above the working water level and air can be drawn in through the pressure box vent and outlet to the cooking chamber via the intake line when the water in the pressure box is below the working water level.

The pressure box thus operates to control water and air exchange in the cooking chamber, and thus the humidity therein. Water from the water supply pools in the pressure box before passing into the cooking chamber. Depending on the level of water in the pressure box, either water or air (entering through the vent) is passed through the intake line to the cooking chamber. The pressure box is a low-cost, highly reliable device with no moving parts.

In preferred forms, the outlet extends Into the pressure box to the working water level spaced from the bottom of the pressure box. The pressure box also can have an overflow opening, above the working water level, to which connects a drain vent/overflow line carrying away excess water or condensation that may arise in the pressure box due to relief of high or low pressure conditions in the cooking chamber. The pressure box also includes a lateral baffle spaced from the vent opening between the vent opening and the overflow opening and a pair of upright baffles spaced apart and depending down from a top wall of the pressure box. The baffles reduce noise in the pressure box and shield the vent from water.

Whether the air and water exchange in the cooking chamber is controlled by positive air displacement or the pressure box, the oven also can include a condensate tank at the cooking chamber drain. The condensate tank collects condensed vapors drained from the cooking chamber prior to leaving the oven through an outlet. The pooled water allows the hot drain water to cool somewhat, by conduction or by mixing with cooling water, before exiting the oven. It also provides a water barrier at the drain such that the cooking chamber is not in direct communication to the outside air, unless desired. This, particularly when combined with the pressure box, retains heat and steam in the cooking chamber and thus greatly increases the efficiency of the oven.

In preferred forms, the water level in the tank is established by a special outlet extending up from the bottom of the tank to define two outlet passageways, one higher than the other. A drain extends down from the cooking chamber into the condensate tank to a level below the second outlet passageway so that under normal conditions the outlet of the drain is immersed in water. A solenoid valve, operated by the electronic control, can block and open the lower outlet passageway or move a separate (cylindrical) member defining the higher outlet passageway. In either case, actuating the valve will allow water to pass through the lower passageway to drain the water in the tank.

Preferably, two temperature probes, electrically coupled to the control unit, are dispose in the condensate tank, one below the water to measure the drain water temperature for use regulating the drain water temperature. The other temperature probe is at a bypass hose leading from the cooking chamber to the tank outside of the cooking chamber to measure the air temperature. The signal from this temperature probe is used by the controller to operate the water valve and (and air, vent or drain valves if applicable) and the to regulate humidity.

In still other preferred forms, the oven can also include an atomizer element within the fan interior receiving water from the intake line and acting to break up the water before entering the fan. The air is directed at the interior portion of the fan and the intake line is selectively controllable to pass outside water and air into the cooking chamber. The atomizer increases the surface area of the impinging water and thus improves thermal efficiency.

These and still other advantages of the present invention will be apparent from the description of the preferred embodiments which follow.

DETAILED DESCRIPTION OF THE PREFERRED EMBODIMENTS

Figure 1:
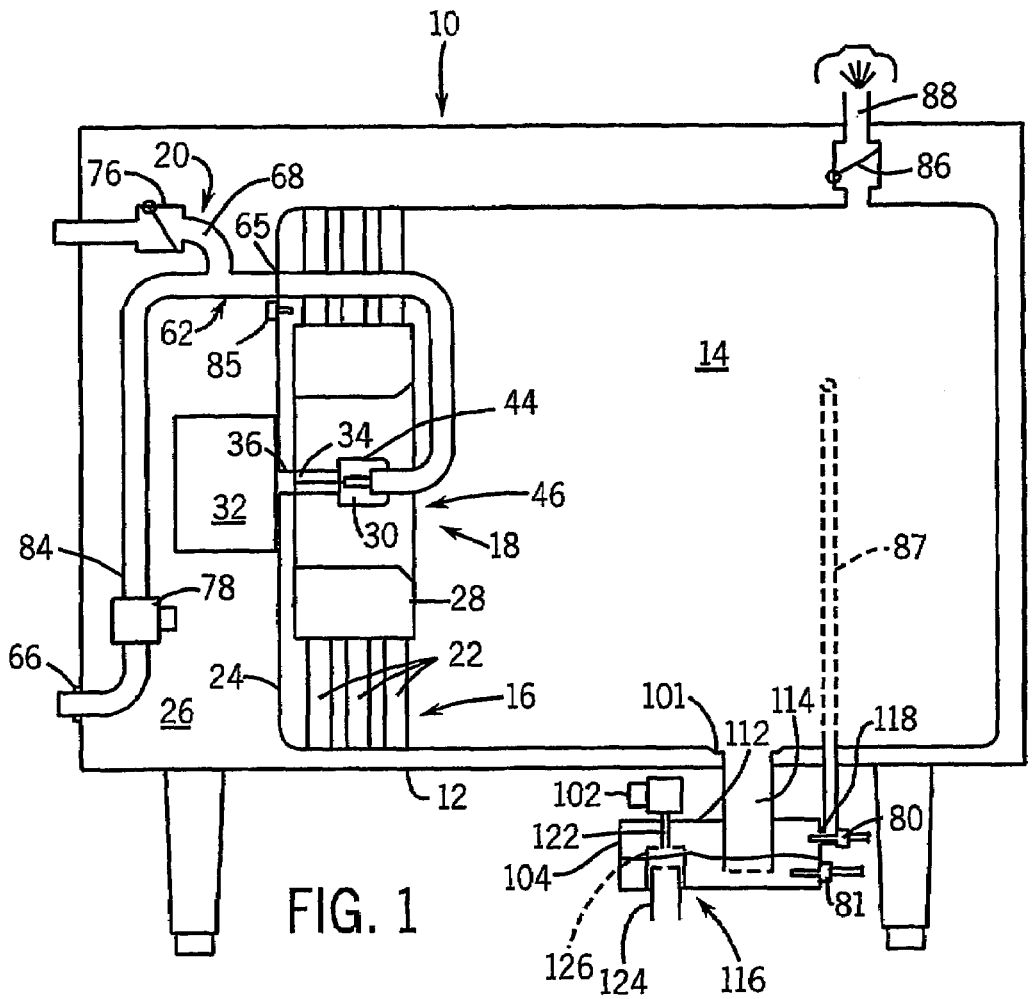
FIG. 1 is a schematic front view of a combination convection and steam oven having the humidity control system of the present invention.
Figure 2:
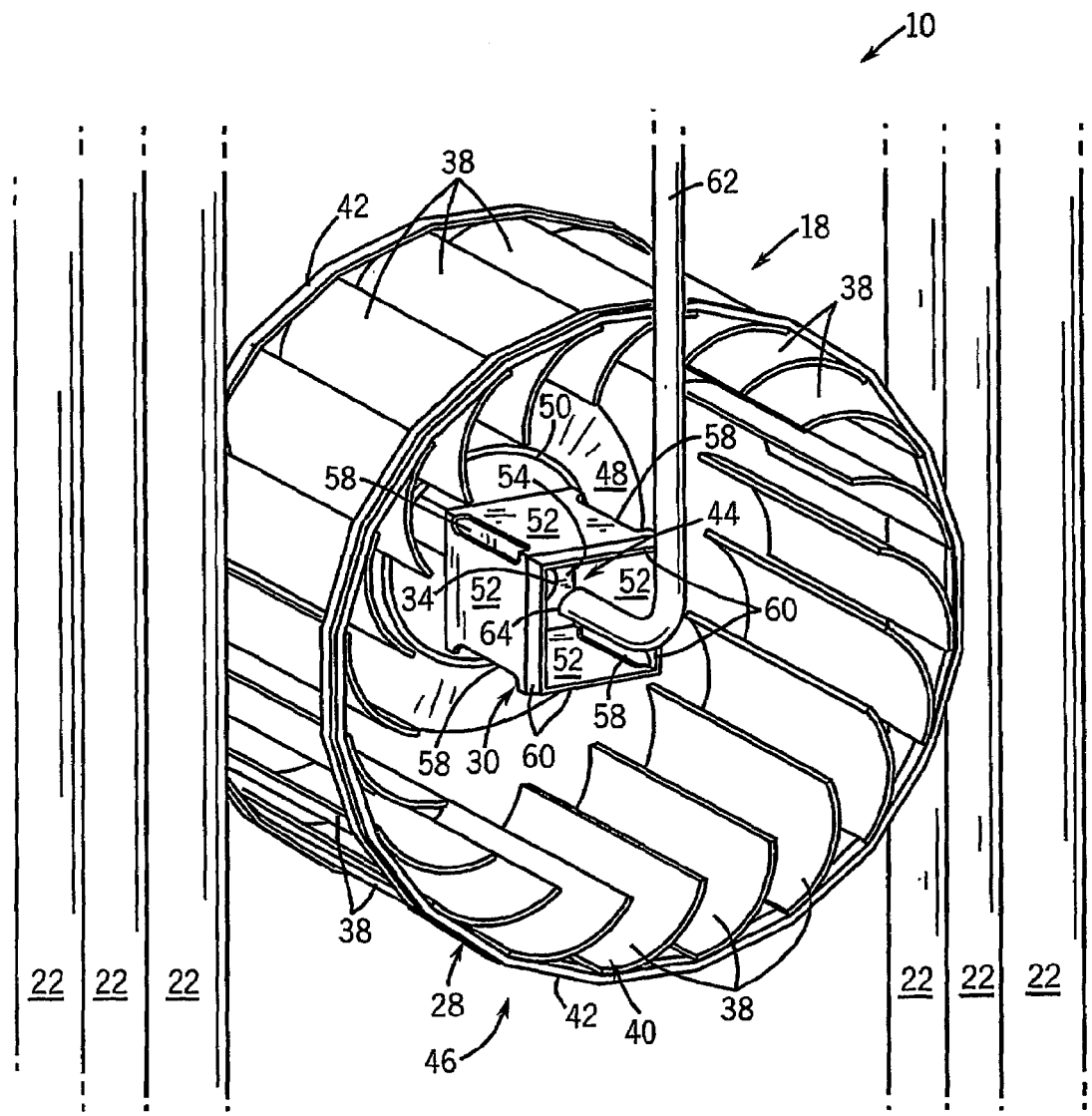
FIG. 2 is an enlarged perspective view of an interior end of an air and water intake line leading to an interior portion of an atomizer assembly within a cooking chamber of an oven enclosure.
Figure 3:
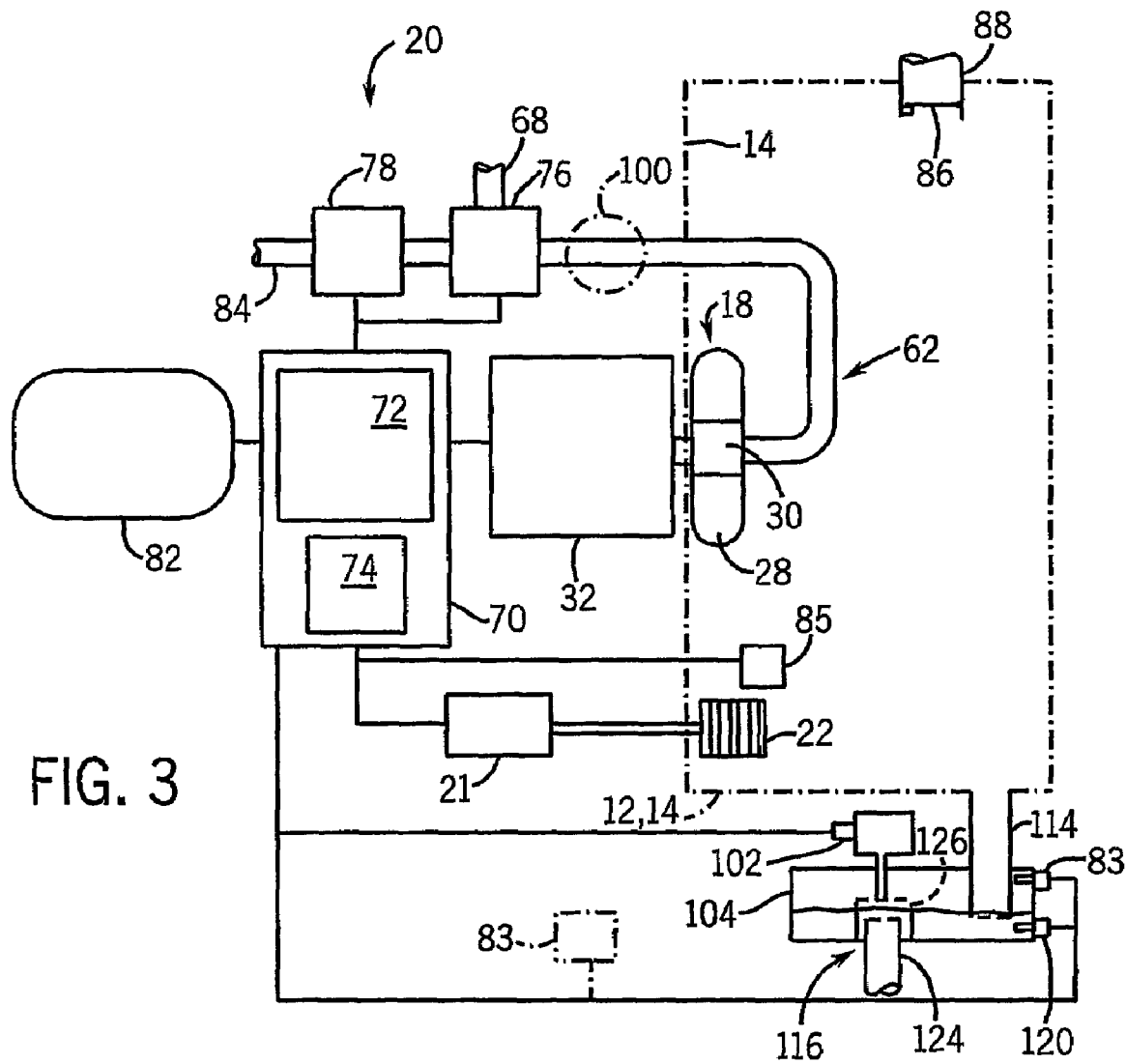
FIG. 3 is a block diagram of the humidity control system of the oven of FIG. 1.

Referring to FIGS. 1–3, a combination convection and steam cooking oven 10, includes an oven enclosure 12 defining a cooking chamber 14 for heating foodstuffs. The oven 10 also includes a heating system 16, an atomizer assembly 18 and a humidity control system 20. The heating system 16 generally includes burners 21 which heat gas circulated through heating elements 22 preferably consisting of metallic conduits. Preferably, the heating elements 22 include two sets of three conduits extending vertically in close proximity to a partition wall 24 of the oven enclosure 12 separating the cooking chamber 14 from an electronics compartment 26. It should be noted that the heating elements 22 could also be suitable solid resistive heating elements.

Referring to FIGS. 1 and 2, the atomizer assembly 18 includes a motor-operated fan 28 and an atomizer cup 30 both of which are disposed between the heating elements 22, three of the heating elements 22 being on each side of the atomizer assembly 18. An electric motor 32 is mounted within the electronic compartment 26 by suitable bracketry (not shown) to the partition 24 so that its rotating shaft 34 extends through an opening 36 in the partition 24 to mount the fan 28 and the atomizer cup 30.

The fan 28 is a squirrel cage design having a plurality of inwardly cupped blades 38 attached at a fixed edge 40 to circular rims 42 aligned in parallel. The blades 38 are oriented to draw air into a fan interior 44 through an open side 46 of the fan 28 and expel air radially outward toward the heating elements 22 when rotated by the motor 32. Opposite the open side 46, the fan 28 has a wall 48 with a concentric opening 50 for mounting the fan 28 to the motor shaft 34.

The motor shaft 34 also mounts the atomizer cup 30 at the fan interior 44. In a preferred embodiment, the atomizer cup 30 is an open box with four rectilinear walls 52, preferably made of a material resistant to the affects of heat and corrosion, such as stainless steel, joined together at side edges and to a back wall 54 having an opening 56 through which the motor shaft 34 is inserted. The fan 28 and the atomizer cup 30 can be mounted to the motor shaft 34 by any suitable connection, such as a press-fit, threaded fastener or slot pin and connection. The atomizer cup 30 preferably includes lengthwise slots 58 at the side edges sized large enough so as not be easily clogged by buildup of calcium deposits from the water. The atomizer cup 30 also has an inwardly tapered lip 60 at it open end to provide a trough preventing water at the inner surfaces of the walls 52 from exiting out the open end.

Referring to FIG. 1, the humidity control system 20 includes an open-ended intake line 62, consisting of suitable conduit or tubing, extending from outside of the cooking chamber 14 to within the atomizer cup 30 in the fan interior 44. The intake line 62 is used to selectively introduce water or air into the cooking chamber 14 during the cooking process to control the amount of moisture in the cooking chamber 14.

In particular, the intake line 62 is a suitable non-corrosive tubing that has an open orifice 64 at the end disposed within the atomizer cup 30. The intake line 62 is bent as needed to extend into the cooking chamber space, around the fan 28 and back through an opening 65 in the partition 24. The intake line 62 continues through the oven enclosure 12 to a fitting 66 in an external wall at which an external water supply line (not shown) can be coupled to the intake line 62. The intake line 62 also includes an air line branch 68 extending to another opening in an exterior wall of the oven enclosure 12 for carrying relatively cool and dry outside air into the cooking chamber 14.

Referring to FIGS. 1 and 3, the flow of water and air through the intake line 62 and into the cooking chamber 14 is controlled by an electronic control unit (ECU) 70 having a suitable microprocessor 72, memory module 74 and interface circuitry. The ECU 70 operates electronic air 76 and water 78 valves. Preferably, the air valve 76 is a motorized butterfly valve inline with the air line branch 68 and the water valve 78 is an electric solenoid inline with an upstream, water-only segment 84 of the intake line 62. The ECU 70 controls these valves in response to inputs from one or both of temperature probes (or sensors) 80 and 81 providing control signals; in this case temperature inputs, indicative of the moisture in the cooking chamber 14, as described below. Alternatively, the control signal can be provided by a dedicated humidity sensor 83, such as an electronic hygrometer, located in the cooking chamber 14. An extra temperature sensor 85 can extend through the partition 24 near the heating elements 22 for providing cooking chamber temperature input to the ECU 70. The ECU 70 can also operate the air 76 and water 78 valves according to control signals from a user interface 82 having input controls affixed to a front exterior of the oven 10, which is the main control interface for all cooking processes of the oven 10, controlling for example heating settings, cooking modes (radiant, convective and/or steam), fan speed, cooking time, etc.

Accordingly, as shown in FIG. 3, the ECU 70 is electrically coupled to the air valve 76, water valve 78, a drain valve 102 (described below), temperature sensors 80 and 81 (or humidity sensor 83), user interface 82 and fan motor 32. By closing and opening the valves 76, 78 and 102 as needed, water and/or air can be introduced into the cooking chamber 14 through the intake line 62 and vented as needed to control the humidity in the cooking chamber 14.

The humidity control system 20 of the present invention operates to provide the correct moisture content in the cooking chamber 14 during steam or non-steam cooking. During convection cooking, for example, the ECU 70 can close the water valve 78 so that no water is fed to the cooking chamber 14. The ECU 70 energizes the burner to the desired temperature and operates the motor 32 to rotate the fan 28 to pick up and circulate heat radiating from the heating elements 22. The ECU 70 can also be controlled (via the user interface 82) to allow radiant heating only, in which case the atomizer assembly 18 is not rotated.

During radiant or convective heating, the ECU 70 will digitize and sample at prescribed intervals the inputs from one or both of the temperature sensors 80 and 81. The ECU 70 processes these digitized control signals according to algorithms stored in the memory module 74 to determine whether the moisture content within the cooking chamber 14 is within acceptable limits for the cooking settings. For example, during radiant or convective cooking, if the temperature at sensor 80 is too high, indicating excess moisture in the cooking chamber 14, for example due to high water content food, then the ECU 70 opens the air valve 76. Rotation of the atomizer assembly 18 causes a low pressure region to develop in the fan interior 44 so that relatively cool and dry outside air can be drawn into the cooking chamber 14 through the intake line 62. This pressurizes the cooking chamber 14, so that at a predetermined pressure, a pressure valve 86 over a exhaust vent opening 88 leading outside the cooking chamber 14 will open. In any event, when the temperature at sensor 80 is sufficiently low, indicating a reduced humidity level in the cooking chamber 14, the ECU 70 closes the air valve 76 so that the pressure in the cooking chamber 14 is equalized with the ambient air. This in turn causes the pressure valve 86 to close.

Figures 4A, 4B:
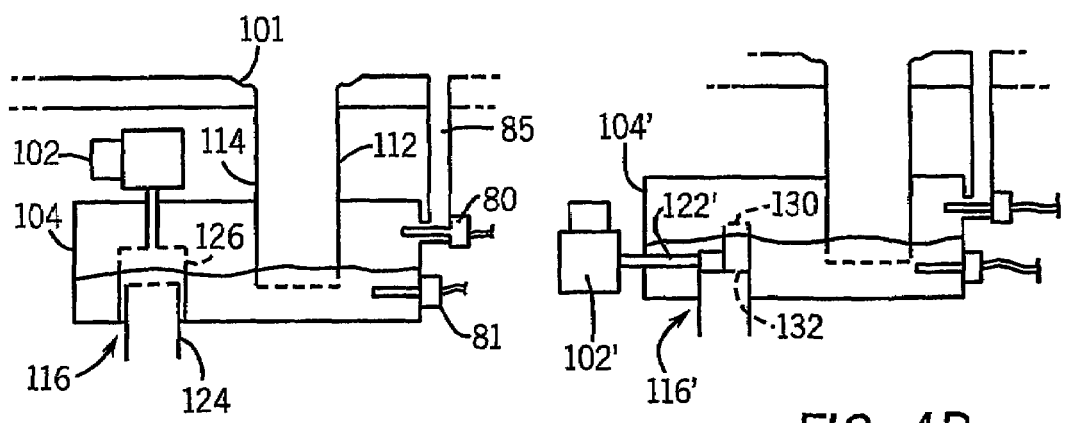
FIGS. 4A and 4B are enlarged schematic views of two embodiments of drain systems for the oven.

Referring to FIGS. 1 and 4A, in addition to the air and water valves, the drain valve 102 can be operated to control drain water in a condensate tank 104 receiving in communication with a drain 101 in the bottom of the oven cooking chamber 14. Specifically, the condensate tank 104 is situated beneath the drain 110 of the cooking chamber 14 and defines a vessel for collecting condensation from the steam process in the cooking chamber 14. The condensate tank 104 has a main opening 112 at the top of the tank through which the tubular drain extension 114 extends and a drain outlet 116 at the bottom of the tank. The condensate tank 104 also has an opening 118 in a side wall near the top of the tank for a bypass hose 87 connected at the other end to an opening in the cooking chamber 14 as well as openings for a water line (not shown), the temperature sensors 80 and 81 and a solenoid 122 of the drain valve 102.

In the embodiment shown in FIG. 4A, the drain outlet 116 is comprised of an outlet pipe 124 extending up into the tank spaced up from the bottom wall. The outlet pipe 124 is disposed within a separate open-ended pipe extension 126 having a greater diameter and coupled to the solenoid 122. The outlet pipe 124 thus defines one passageway of the outlet and the extension 126 defines a second passageway. When the drain valve 102 is in the position shown in FIG. 4A, the bottom end of the extension 126 rests on the bottom wall of the tank such that as condensation enters the tank, drain water will collect in the tank and rise up to the top end of the extension 126. As can be seen, the top end of the extension 126 is vertically above the outlet of the drain extension 114 which itself is below the top of the outlet pipe 124. The drain valve 102 is in this position during normal steam operation of the oven 10. Water will continue to pool in the tank until it reaches the top of the extension 126 in which case it will pass down through the extension 126 and the outlet pipe 124. Thus, the top of the extension 126 provides a particular water level in the tank during normal steam operation. This water level creates a barrier, by virtue of the end of the drain extension 114 being under water, closing off the cooking chamber drain from the outside air. This barrier better retains the heat and humidity in the cooking chamber 14 when relieving pressure imbalances in the cooking chamber 14 during temporary high or low pressure situations. This barrier thus improves the efficiency of the oven. It also helps prevent unpleasant kitchen odors from infiltrating the cooking chamber 14 through the drain and getting into the food.

If the cooking chamber 14 is to be drained or if the humidity level is too high, the drain valve 102 can be opened. That is, the solenoid 122 can be raised so that pipe extension 126 raises from the floor of the condensate tank 104. This allows water to flow under the extension 126 and into the outlet pipe 124, thereby allowing the tank to drain to the level of the top of the outlet pipe 124, in other words, below the drain extension 114. While the lower end of the drain extension 114 remains submerged, the decreased water level provides insufficient head to hold back the pressure in the cooking chamber 14 and thus allows the hot and moist air inside the cooking chamber to escape. The drain valve 102 can be operated by the ECU 70 independently or in conjunction with active or passive operation of the pressure valve 86 as needed for rapid dehumidification or pressure relief.

It should be noted also that the temperature sensor 80 is located above the water and the temperature sensor 81 is in the water because it is below the top of the outlet pipe 124. Temperature sensor 81 thus is always reading the temperature of the water in the condensate tank 124. This measurement can be sent to the ECU 70 to monitor the temperature of the drain water and used to add cooling water into the tank if necessary through a water line (not shown) having its own solenoid valve. Cooling the drain water will reduce the humidity in the cooking chamber 14 and the temperature at sensor 80.

Additionally, as shown in FIG. 4B, the drain outlet 116' can be a monolithic structure having a divided top end defining a stepped upper inlet 130 and a lower inlet 132. The upper inlet 130 would be at the height of the top end of the pipe extension 126 and the lower inlet 132 would correspond to the top end of the outlet pipe 124, discussed above. Here, the drain valve 102' would operate the solenoid 122' having an enlarged head to open and close the lower inlet 132 to regulate drainage through the condensate tank 104', as discussed.

As mentioned above, introduction of outside air into the cooking chamber 14 could also be done by the user through the user interface, for example to cool the cooking chamber or for expediting the evacuation of moisture in the cooking chamber 14 when changing from steam to convection or radiant cooking.

When steam cooking is desired, the water valve 78 is operated to allow supply water to flow through the intake line 62 to the atomizer assembly 18. The water valve 78 can be controlled to provide intermittent or steady stream flow of water through the intake line 62. In either case, the flow rate is controlled to provide only the volume of water that can be readily vaporized by the atomizer assembly 18 and the heating elements 22 so that water does not accumulate excessively at the bottom of the cooking chamber 14.

In particular, as the atomizer cup 30 and fan 28 are rotated, the impinging water from the intake line 62 is broken up and directed past the eating elements 22. The atomizer cup 30 and fan 28 act to break up the water in three stages. First, water impinges on the inside surface of the atomizer cup walls 52, which disrupt and agitate the impinging water. The rectilinear configuration agitates the water to a greater extent than smooth curvilinear surfaces. Second, the centrifugal force generated by rotation directs the water within the atomizer cup 30 radially outward to the slots 58. As the water passes through the slots 58 it is sheared by its edges. Third, the fan 28 draws this water into contact with the revolving blades 38, which further shears the water. The water is broken up to increase its surface area as it passes by the heating elements 22. According to known heat transfer principles, increasing surface area of a body increases the rate at which heat is transferred to that body. Here, the water flowing from the intake line 62 will be more efficiently vaporized to steam by the heating elements 22 due to the atomization of the water. Thus, the heating elements 22 will consume less energy while generating a given amount of steam.

The humidity control system 20 can also operate during steam cooking to prevent excess moisture within the cooking chamber 14 which could overcook or saturate the food. The process of humidity control is performed as described above during radiant or convective cooking albeit using different stored algorithms that accommodate for high moisture content in the cooking chamber 14 and allow for alternating and simultaneous opening of the air 76 and water 78 valves as well as the drain valve 102. Thus, during steam cooking the intake line 62 can carry air only or an intermittent air-water mixture into the cooking chamber 14 for part of the cooking process.

Thus, the invention provides a humidity regulating system for use in a combination oven in which relatively cool and dry air is introduced into the cooking chamber. This positive inward air flow pressurizes the chamber which causes an exhaust vent to open so that the hot, moist air in the working chamber can be evacuate. The positive air flow allows for more efficient and accurate humidity control.

The above describes a combination oven with a humidity control system in which dry air is brought into the cooking chamber to control humidity in conjunction with a vent and a condensate tank (of various configurations). The oven of the present invention, however, could be practiced using a no-moving-part pressure box as the primary component, aside from the water control valve, for regulating the humidity in the cooking chamber. Such an embodiment of the invention will now be described in detail with reference to FIGS. 4–7. All components of this embodiment of the oven are the same as (or similar to) that described above unless indicated otherwise. All similar elements will thus be referenced with similar numbers albeit with the suffix "A".

The combination oven 10A thus includes an oven enclosure 12A defining a cooking chamber 14A as well as a heating system 16A, an atomizer assembly 18A and a humidity control system 20A, as described above. The oven 10A also includes the above described electronics, including an ECU 70A, temperature sensors 80A, 81A and 85A (and/or humidity sensor 83A) and user interface 82A, as well as the drain condensate tank 104A and related components. Note, however, that this embodiment of the oven does not have a separate cooking chamber vent (and pressure valve) nor an air valve. Also, the drain condensate tank 104A operates by gravity without a drain valve to provide the aforementioned water barrier at the drain and the condensate tank 104A is vented to outside air via a vent/overflow hose, described below.

Figure 7:
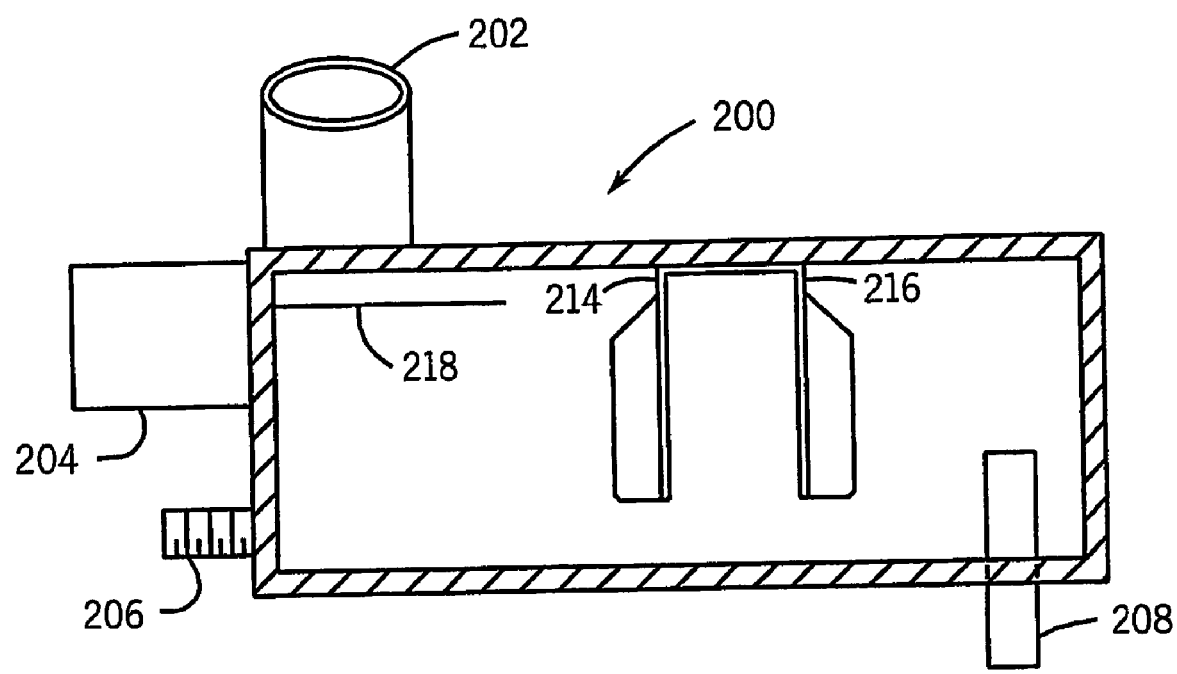
FIG. 7 is a rear view of the pressure box with a back wall removed.

As mentioned, the humidity control system of this embodiment of the oven centers around a pressure box 200. Referring to FIG. 7, the pressure box 200 is a stainless steel or sheet metal box having top, bottom, front, back and right and left walls defining a cavity therein approximately 9"×3.5"×3". Extending up from an opening in the top wall is a vent tube 202, preferably a 1.5" pipe section with a tapered top end that extends through the top of the oven cabinet. A drain vent/overflow tube 204, also preferably a 1.5" diameter pipe section, extends laterally from an opening in an upper region of the right side wall. Below the drain vent/overflow tube 204 is a inlet fitting 206 extending from another opening in the right side wall. An inlet tube 208 extends almost halfway into the pressure box 200 through the bottom wall at a side of the box opposite the vent tube 202. The inlet tube 208 is threaded at its lower end for connecting an upstream section 210 of the intake line 62A and the inlet fitting 206 is also threaded to connect a downstream section 212 of the intake line 62A (see FIG. 5).

The inlet fitting 206 and the outlet tube 208 are of smaller diameters, for example, 0.375" inner diameter for the inlet fitting 206 and 0.5" inner diameter for the outlet tube 208. Two spaced apart plate-like upright baffles 214 and 216 are welded to the rear wall between the vent tube 202 and the outlet tube 208 and a lateral baffle 218 is welded to the rear wall spaced down from the vent tube 202. The baffles dampen noise and act as a splash guard for the vent tube 202.

Figure 5:
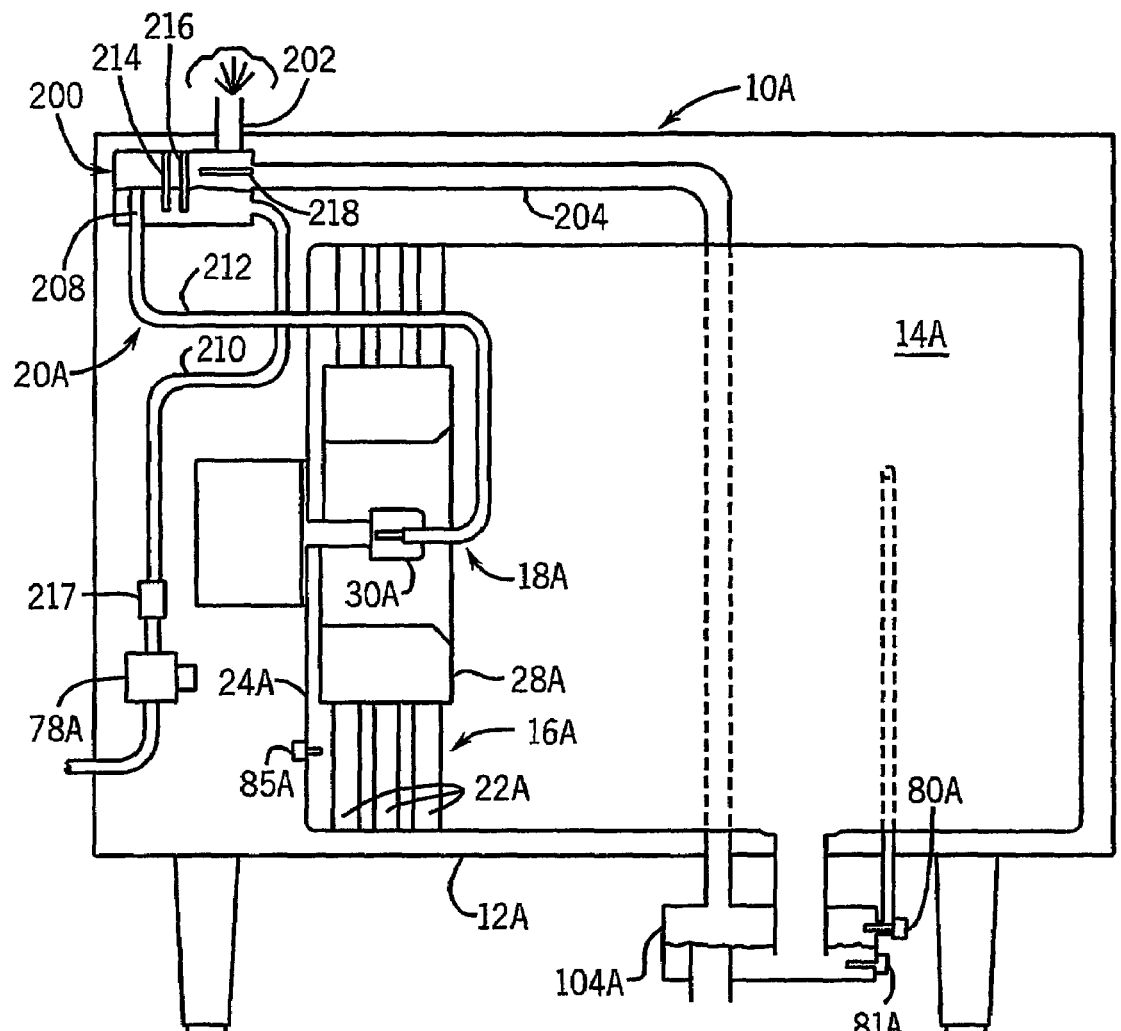
FIG. 5 is a schematic front view of a combination oven having an alternate humidity control system with a pressure box.
Figure 6:
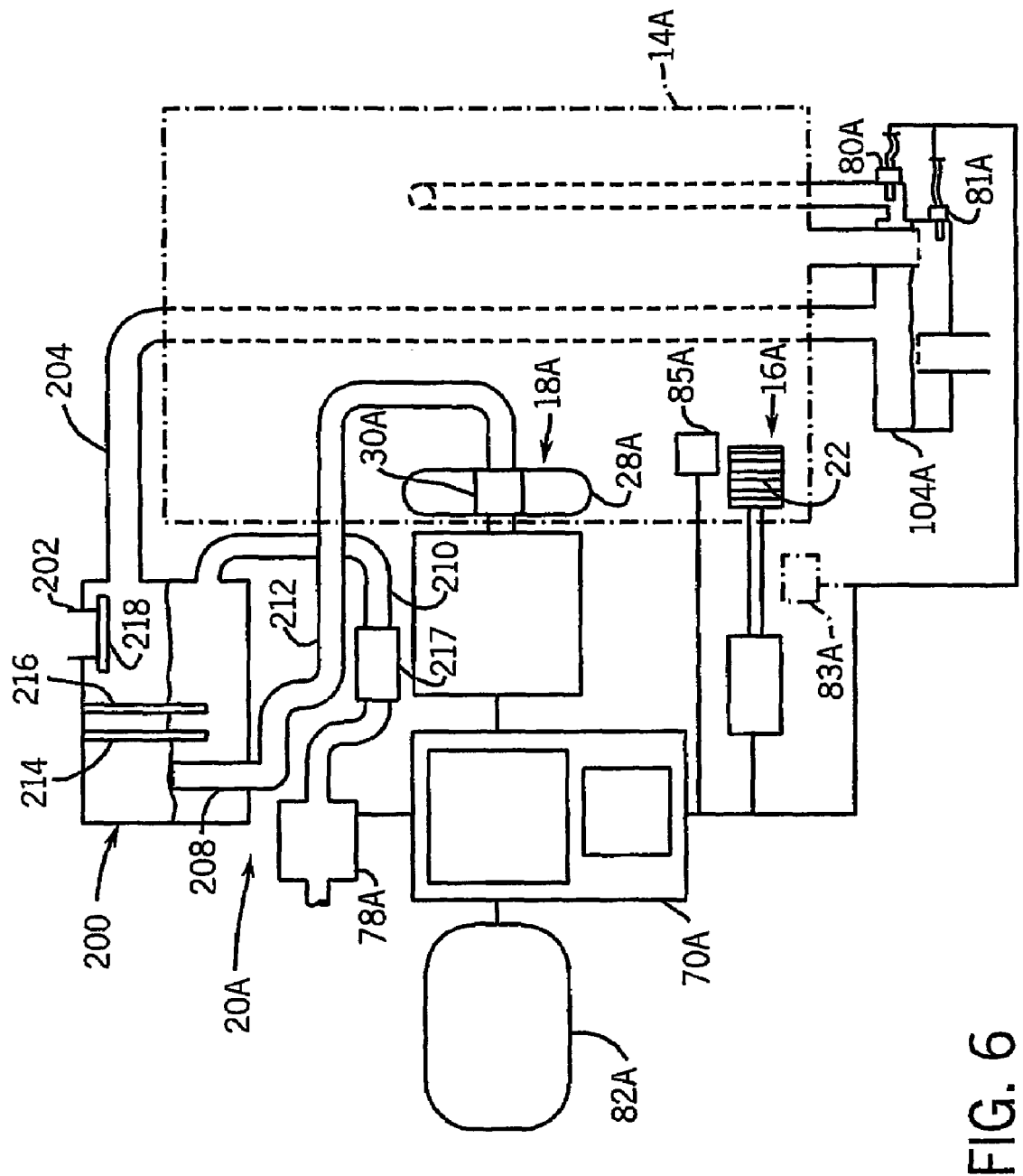
FIG. 6 is a block diagram of the humidity control system of the oven of FIG. 5.

Referring now to FIGS. 5 and 6, the upstream section 210 is coupled at one to the water supply and water valve 78A as well as a flow regulator 217 for controlling flow into the intake line. As mentioned, the other end of the upstream section 210 of the intake line is threaded to the inlet fitting 206. The down stream section 212 of the intake line threads to the outer (lower) end of the outlet tube 208 and passes through the partition wall 24A into the cooking chamber 14A where it turns a 180° bend so that it ends at the interior of the fan 28A and atomizer cup 30A. An vent/overflow hose 220 runs (outside of the cooking chamber 14A) from the drain vent/overflow tube 204 to a corresponding opening in the condensate tank 104A.

The pressure box 200 is connected in series with the intake line 62A. During steam cooking or when higher humidity is required, the water valve 78A is opened which allows water to flow through the upstream section 210 and into the pressure box 200. Water flows into the pressure box 200, but does not immediately flow out of it (at least when initially when the pressure box is empty). Rather, it pools in the pressure box 200 until the level of water reaches the height of the inner end of the outlet tube 208. Because the outlet tube 208 is lower than the overflow opening, water will flow into the outlet tube 208 first and then through the downstream section 212 where it enters the atomizer cup 30A inside the cooking chamber 14A. The water is broken up and dispersed for vaporization by the heating elements 22A, as described above. The low pressure at the center of the fan continues to draw water into the cooking chamber 14A as long as the water level in the pressure box 200 is at or above inner end of outlet tube 208. Thus, moisture is added to the cooking chamber 14A while the pressure box 200 is at or above this working water level. Any excess water over the drain vent/overflow tube 204 would leave the pressure box 200 through the vent/overflow hose 220 and drain into the condensate tank 104A. If less humidity is desired in the cooking chamber 14A, the water valve 78A is closed or dampened so that the pressure box 200 is not filled as fast or at all. As such, the water level will pass through the outlet tube 208 until it is level or slightly below the inner end of the outlet tube 208. At that point, the low pressure at the interior of the fan will draw in air through the vent tube 202, outlet tube 208 and downstream section 212 of the intake line and thus decrease the humidity in the cooking chamber 14A. Under normal operating conditions, the ECU 70A operates to control the water valve as needed to increase or decrease the humidity in the cooking chamber 14A.

The pressure box 200 is thus a simple but effective device for controlling the air and water exchange in the cooking chamber 14A. It has no moving parts or valves that can fail or become clogged with build-up from the kitchen environment, such as grease. The water in the pressure box creates a barrier between the vent and the cooking chamber 14A that helps hold in the heat and humidity during brief periods of pressure relief of the cooking chamber, thereby improving the efficiency of the oven in terms of both water and energy consumption. In fact, the inventors have found that an oven according to the present invention with both a pressure box and a condensate tank has achieved improvements in efficiency of about 50%. This invention thus provides a cost-effective and energy efficient combination oven.

The temporary pressure relief situations mentioned above can be either high or low pressure conditions in the cooking chamber 14A. Low pressure conditions can be created, for example, by the initial insertion of frozen or very cold food items into a heated cooking chamber. Low pressure can also be created when cold water is first brought into the heated cooking chamber 14 for steam cooking or during cleaning when the hot cooking chamber 14A is sprayed down (with separate water nozzles not shown) with cold water. High pressure conditions can also occur in various ways, for example, by closing the oven door rapidly.

In the case of a transient low pressure condition in the cooking chamber 14, any water above the working water level in the pressure box and in the downstream section 212 of the intake line 62A is drawn into the cooking chamber so that drier outside air can be drawn in through the vent to pressurize the cooking chamber 14A. In the opposite, high pressure situation, water in the intake line 62A is forced back into the pressure box 200. The high pressure air can thus pass through the water barrier in the pressure box 200 and exit through the vent. Any excess water in the pressure box 200 resulting from this process with exit through the overflow tube.

The present invention may include other aspects not specifically delineated in the aforementioned preferred embodiments. For example, the atomizer assembly need not include an atomizer cup of the configuration described or at all. Additionally, as shown in hidden lines in FIG. 3, a separate pump 100 (see FIG. 3) could be employed to force air and/or water into the cooking chamber through the intake line, or a dedicated line, rather than using the atomizer assembly to draw in the water and air. Further, although not preferred, the present invention could be practiced without the use of the condensate tank.

Thus, the above is not intended to limit the scope of the invention, and in order to apprise the public of the full scope of the present invention, reference must be made to the following claims.

What is claimed is:

1. A combination steam and convection oven for the preparation of food, the oven comprising:
   a cooking chamber containing a heating element for heating the cooking chamber and vaporizing water piped into the cooking chamber during a steam cooking process;
   an air mover for circulating air within the cooking chamber; and
   an intake line selectively controllable to bring one of air and water from outside the cooking chamber into the cooking chamber, the intake line having one end outside the cooking chamber and an opposite open end inside the cooking chamber.

2. The oven of claim 1, wherein the intake line includes a water line section having a water valve and air line section having an air valve.

3. The oven of claim 2, wherein the air mover is a pump coupled to the intake line and operated to force air into the cooking chamber through the intake line when the air valve is open and the water valve is closed.

4. The oven of claim 2, wherein the open end of the intake line is at a relatively low-pressure area adjacent the air mover.

5. The oven of claim 4, wherein the air mover is a fan that when rotated creates a low pressure area inside the cooking chamber adjacent the open end of the intake line so as to draw air into the cooking chamber through the intake line when the air valve is open and the water valve is closed.

6. The oven of claim 2, further comprising an electronic control unit for operating the air and water valves.

7. The oven of claim 6, further including a sensor detecting a condition in the cooking chamber and sending a control signal to the control unit to operate the air and water valves to control humidity in the cooking chamber.

8. A combination steam and convection oven for the preparation of food, the oven comprising:
a cooking chamber containing a heating element for heating the cooking chamber and vaporizing water piped into the cooking chamber during a steam cooking process;
an air mover for circulating air within the cooking chamber; and
an intake line adapted to bring air from outside the cooking chamber into the cooking chamber, the intake line having one end outside the cooking chamber and an opposite open end inside the cooking chamber;
wherein the cooking chamber further includes an exhaust vent operable to open when the inside of the cooking chamber reaches a prescribed pressure, wherein flow through the intake line and operation of the exhaust vent are coordinated to control the humidity in the cooking chamber.

9. A combination steam and convection oven for the preparation of food, the oven comprising:
a cooking chamber containing a heating element for heating the cooking chamber and vaporizing water piped into the cooking chamber during a steam cooking process;
an air mover for circulating air within the cooking chamber; and
an intake line adapted to bring air from outside the cooking chamber into the cooking chamber, the intake line having one end outside the cooking chamber and an opposite open end inside the cooking chamber;
further including a condensate tank collecting drain fluid from the cooking chamber;
wherein the condensate tank includes an outlet defining a first outlet passageway and a second outlet passageway vertically spaced from the first outlet passageway and wherein a drain extends down from the cooking chamber into the condensate tank to a level below the second outlet passageway.

10. The oven of claim 9, wherein the first outlet passageway is spaced from a bottom of the condensate tank.

11. The oven of claim 10, further including a drain valve controlling flow through the outlet.

12. The oven of claim 11, wherein the drain valve is arranged to control the opening defined by the first outlet passageway.

13. The oven of claim 11, wherein the drain valve moves the second outlet passageway with respect to the first outlet passageway to allow drain fluid to flow to the first outlet passageway from either of vertically spaced openings in the second outlet passageway.

14. The oven of claim 13, wherein the drain valve includes a solenoid.

15. The oven of claim 10, further including a temperature probe in communication with the inside of the tank electrically coupled to an electronic control unit for controlling humidity in the cooking chamber.

16. The oven of claim 15, further including a bypass line external to the cooking chamber and having one end in communication with the cooking chamber and an opposite end in communication with the condensate tank, wherein the temperature probe is in communication with the cooking chamber through the bypass line.

17. The oven of claim 16, further including a second temperature probe disposed in the condensate tank and coupled to the control unit for sensing the temperature of the drain fluid in the condensate tank.

18. A combination steam and convection oven for the preparation of food, the oven comprising:
a cooking chamber containing a heating element;
an air mover for circulating air within the cooking chamber;
an intake line extending from outside the cooking chamber and having an opening within the cooking chamber; and
a pressure box having an inlet and an outlet in series with the intake line and a vent in communication with air outside the cooking chamber, the pressure box receiving water through the inlet from the intake line and establishing a working water level within the pressure box;
wherein water can pass through the pressure box outlet to the cooking chamber via the intake line when the water in the pressure box is above the working water level and air can be pass through the pressure box vent and outlet to the cooking chamber via the intake line when the water in the pressure box is below the working water level.

19. The oven of claim 18, wherein the outlet extends into the pressure box to the working water level spaced from a bottom of the pressure box.

20. The oven of claim 19, wherein the inlet is below the working water level.

21. The oven of claim 18, further including an overflow line and wherein the pressure box further includes an overflow opening coupled to the overflow line.

22. The oven of claim 21, wherein the overflow opening is above the working water level.

23. The oven of claim 21, further including a condensate tank connected to the overflow line and the cooking chamber for collecting drain fluid.

24. The oven of claim 23, wherein the condensate tank has an outlet defining a first outlet passageway spaced from a floor of the condensate tank and a second outlet passageway vertically spaced from the first outlet passageway and wherein the drain extends down from the cooking chamber into the condensate tank to a level below the second outlet passageway.

25. The oven of claim 24, further including a temperature probe in communication with the inside of the tank electrically coupled to an electronic control unit for controlling humidity in the cooking chamber.

26. The oven of claim 21, wherein the pressure box includes a lateral baffle spaced from the vent opening between the vent opening and the overflow opening.

27. The oven of claim 26, wherein the pressure box includes a pair of upright baffles spaced apart and located between the vent opening and the inlet.

28. The oven of claim 18, wherein the air mover is a fan disposed in the cooking chamber and wherein the opening of the intake line is disposed adjacent an interior of the fan.

29. The oven of claim 28, further including an atomizer cup disposed in the interior of the fan and rotatable with the fan.

30. The oven of claim 18, further including a valve upstream from the pressure box for controlling water flow into the pressure box.

* * * * *

UNITED STATES PATENT AND TRADEMARK OFFICE
CERTIFICATE OF CORRECTION

PATENT NO. : 6,987,246 B2
DATED : January 17, 2006
INVENTOR(S) : William J. Hansen et al.

It is certified that error appears in the above-identified patent and that said Letters Patent is hereby corrected as shown below:

<u>Title page,</u>
Item [73], Assignee, "Alto-Sham, Inc." should read -- Alto-Shaam, Inc. --.

<u>Column 7,</u>
Line 53, change "eating" to -- heating --.

Signed and Sealed this

Eighteenth Day of April, 2006

JON W. DUDAS
*Director of the United States Patent and Trademark Office*